(No Model.)   3 Sheets—Sheet 1.

H. BROLLY.
TAILOR'S MEASURE.

No. 277,453.   Patented May 15, 1883.

Witnesses:
Richard P. Dumary
Chas. Leerink

Hugh Brolly
Inventor (No Model.)
H. BROLLY.
TAILOR'S MEASURE.
No. 277,453.   Patented May 15, 1883.
3 Sheets—Sheet 2.
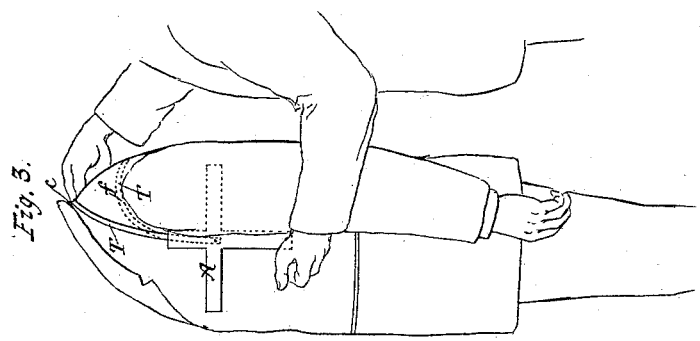
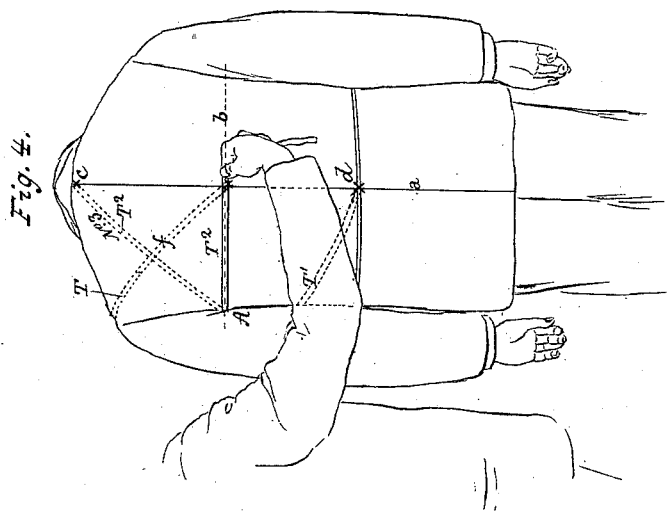
Witnesses:
Richard P. Dunyary
Charles Leekirk
Hugh Brolly
Inventor (No Model.) 3 Sheets—Sheet 3.

H. BROLLY.
TAILOR'S MEASURE.

No. 277,453. Patented May 15, 1883.

Witnesses:
Richard P. Dumary
Chas. Leirink

Inventor.
Hugh Brolly

UNITED STATES PATENT OFFICE.

HUGH BROLLY, OF ALBANY, NEW YORK.

TAILOR'S MEASURE.

SPECIFICATION forming part of Letters Patent No. 277,453, dated May 15, 1883.

Application filed September 4, 1882. (No model.)

*To all whom it may concern:*

Be it known that I, HUGH BROLLY, a citizen of the United States, residing at Albany, in the county of Albany and State of New York, have invented a new and Improved Coat-Measuring Instrument, of which the following is a full and clear description, reference being had to the accompanying drawings, forming a part of this specification.

My invention relates to an instrument for taking the measurements of size and proportions of persons of customers for coats, and transferring the same to paper for making patterns, or to the cloth to be made up in coats; and it consists of an instrument made with the form and having the several scales and tape-measures for operation as will be hereinafter particularly described.

The object of my invention is to provide an instrument by which the several measurements and points of the hanging of coats from the person will be readily taken from two established lines on the instrument, which will be at right angles with each other, and be readily transferred to paper or cloth for drafting the forms of patterns or parts of coats in agreement with the measurements previously taken. I attain this object by means of the device illustrated in the accompanying drawings, and the mode of procedure also illustrated in the same, in which—

Figures 1, 2:
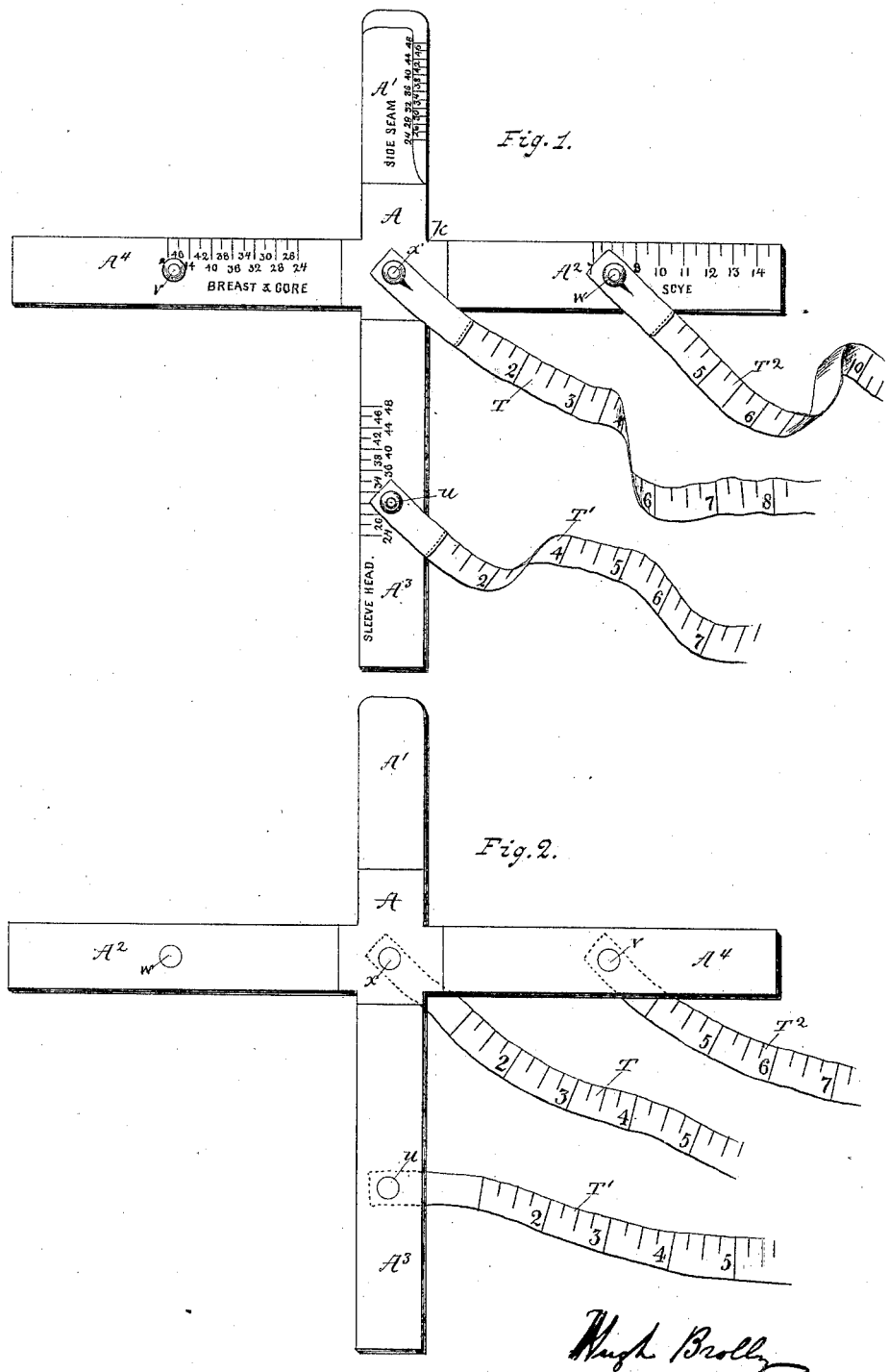
Figure 5:
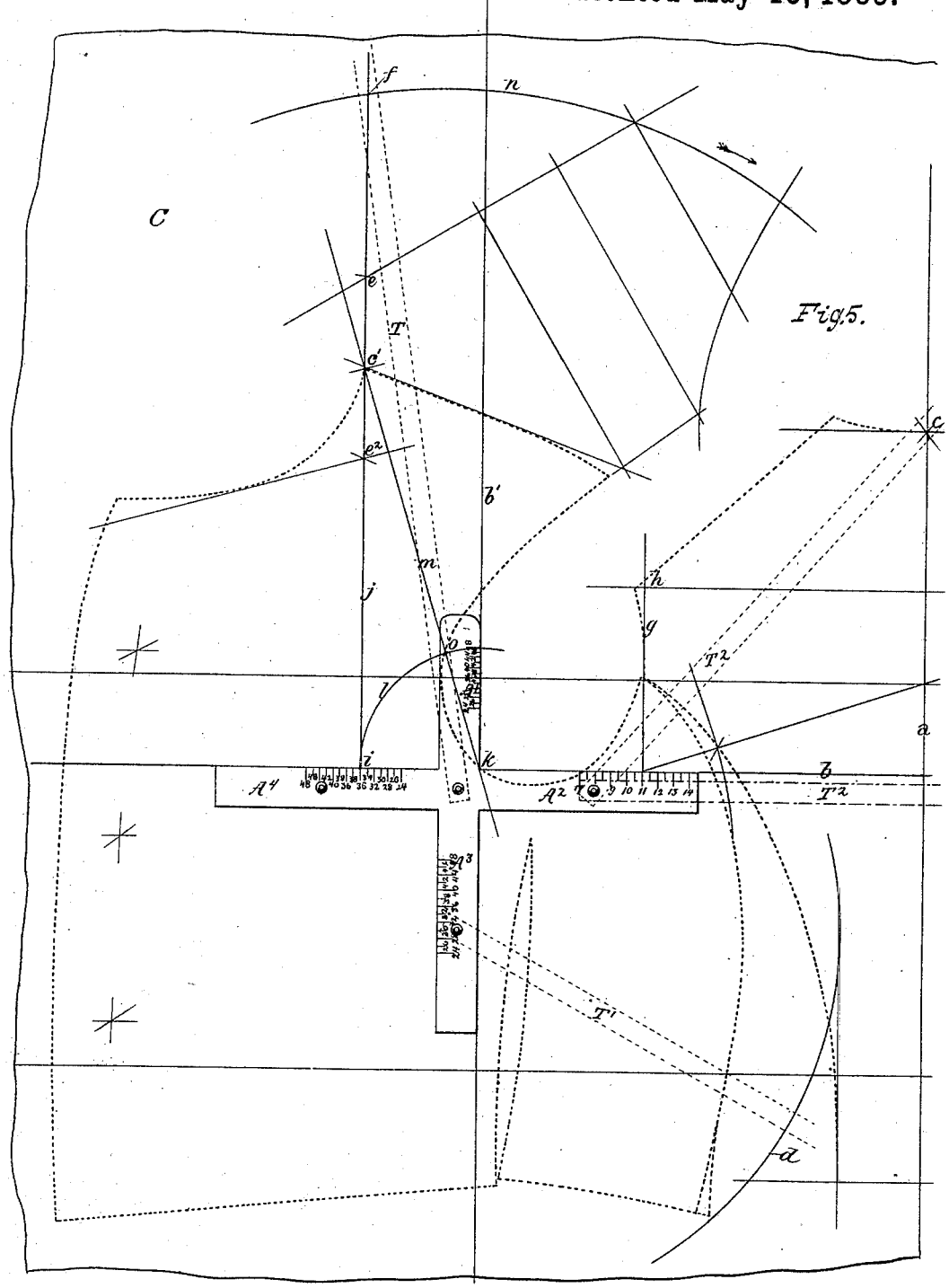

Figure 1 is a perspective view of my improved instrument with its face side up and the tapes in position, arranged for transfer of measurements to paper or cloth. Fig. 2 is a view of the instrument from its rear side with the tapes adjusted and arranged for measurement of the person. Fig. 3 is a profile view of the person being measured by the instrument. Fig. 4 is a rear view of the same; and Fig. 5 is a view of draft of patterns of parts of a coat, illustrating the manner in which the instrument is employed for a transfer of measurements.

The same letters of reference indicate like parts throughout the several views.

In the drawings, A represents the body of the instrument or coat-measurer, in which said body is shown to be in the form of a cross, with limbs $A'$, $A^2$, $A^3$, and $A^4$, of which limb $A'$ is provided with a scale made from point $k$ upward under a division for "eighths" of "breast-measure," and is intended to establish the point of line of top of "side seam." The scale on limb $A^2$ is also made from point $k$, and is divided on the "scye-line" in ratio of three-eighths to one inch, and by it the width of scye or arm-hole is established. The scale on limb $A^3$ runs upward from the lower end of said limb, and is divided for "sixths" of breast-measure, and is only used for drafting the "sleeve-head." The scale on limb $A^4$ is made on the scye-line of the said limb and from point $k$, and is divided from said point by sixths of breast-measure, by which the "gore-point" line is established. With this cross of limbs of the instrument are employed three tape-measures, each bearing inch-scale, as tapes T, T', and $T^2$, in which tape T is pivoted to pivot $x$, placed central at the intersection of the arms, as shown, and tape T' to pivot $u$ on limb $A^3$, for finding the "sinking of the waist." Tape $T^2$ is used interchangeably with pivots $v$ and $w$, and to the former when measurements are made from the person, and to the latter when a transfer of measurement is made to the cloth or pattern.

When the instrument is to be used for taking measurements from the person of the customer, the several said tapes will have their scale sides turned down, so as to face the face side of the scales on the limbs of the instrument, or the reverse to that shown in Fig. 1, and with tape $T^2$ buttoned to pivot $v$. The instrument will then be placed in an erect position under the left arm of the person measured, and, as shown in Fig. 3, with the limb $A'$ forward of the shoulder and pressing the front of the same, and with limb $A^2$ square across under the armpit, in which position the instrument is held by the left hand of the measurer, as shown in said Fig. 3. The operator, thus holding the instrument, will handle the tapes with his right hand, and will, with tape $T^2$ swinging from pivot $v$, measure to back-seam line $a$, Fig. 4, in line of direction of scye-line $b$, same figure, and, with the same measure or tape, will measure up to the collar on back-seam line $a$ to point $c$, in direction of line No. 3, Fig. 4. Dropping tape $T^2$ and taking up tape T', he will measure off in direction of line of sinking of waist to point $d$, Fig. 4, and dropping tape T', the measurer will, with tape T, run the same from forward of shoulder up to top of back-seam as to point $c$, Fig. 3, and then, with the same tape, measure up and over the shoulder-point to scye-line $b$ on back-seam $a$, in direction of line $f$, as indicated in Figs. 3 and 4. It is supposed that as the several measurements are taken they are properly entered in the usual manner in a measure-book, to be subsequently referred to by the measurer or cutter.

Having described the instrument and its several parts, I will illustrate the manner in which the several measurements taken are transferred to the cloth, and the several points in the measurement are established on the cloth to be cut, or the paper from which patterns are to be made, making reference to Figs. 3 and 4, and also to Fig. 5, illustrating a diagram of the patterns. For the purpose of this illustration I will set forth an assumed measurement of the person of a customer previously taken by my instrument, as follows: the breast-measure, thirty-six inches; the measure on scye-line $b$ by tape $T^2$, eleven inches; the measure from top of scye-line by the same tape to top of back-seam, fifteen inches; that by tape T' to the point of sinking of waist at back-seam, as at $d$, nine and one-half inches; and that by tape T to top of back-seam, as at $c$, twelve and one-half inches; and that by the same tape to over the point of shoulder to intersection of scye-line $b$ with back-seam $a$, seventeen inches. With these several measurements before him, the cutter will proceed as follows to effect a transfer of them to cloth or paper C in Fig. 5: Tape $T^2$ will be transferred to pivot $w$, and the several tapes be arranged with their scale sides up, as shown in Fig. 1. The operator will next proceed to adjust the instrument in proper situation and position on cloth C. This he will do by laying the instrument down on the cloth with its face side up, and set the same off to the left to a distance back from back-seam line $a$, previously drawn, to a distance equal to the No. 11 on tape $T^2$ scale, with the upper edge or scye-line edge of the limbs $A^2$ and $A^4$ at right angles with the back-seam line $a$, and produce on the cloth scye-line $b$, and when thus set he will point off on the cloth at No. 11 of the scale on limb $A^2$, and draw line $g$ upward from the same at right angles to scye-line $b$, Fig. 5, and line $g$ will represent back-scye of arm-hole. The operator will then, with the same tape, $T^2$, measure off fifteen inches, according to the scale on said tape, to top of back-seam as to point $c$, as indicated by dotted lines No. 3. He will then, with tape T', lay off the curved line $d$ from a radius of nine and one-half inches by scale on said tape to establish the point of sinking of the waist. He will then, by breast-scale on limb $A^4$, set off one-sixth of the breast-measure from front scye-line $b'$, point $i'$, which will fall on the No. 36 of scale on limb $A^4$, and from said point $i$ square up gore-point line $j$ at right angles to line $b$, as shown. He will then, with tape T, cut off on gore-point line $j$ twelve and one-half inches by scale on said tape, point $c'$ corresponding with point $c$, before mentioned, which is point of top of back-seam. Then with same tape, T, he will measure up by the scale thereon a distance of seventeen inches, as to point $f$ on line $j$, which will correspond with the measurement over point of shoulder to intersection of scye-line $b$ with back-seam line $a$. He will next strike from point $k$ curved line $l$ at a radius equal to distance between points $k$ and $i$, and will then find point $o$ by producing from point $k$ to gore-point $c'$ line $m$, which will cross curved line $l$, and the point of intersection will be point $o$, and from said point $o$ he will strike curved line $n$ from point $f$ back toward back-seam line $a$.

Having thus established the several points and lines above mentioned in perfect agreement with the several measures and scales, the instrument is removed, and the measurer will then proceed to draft the several parts or pieces of the coat in the usual manner practiced by the trade.

It will be readily understood that as the several measurements of the person were taken from the several pivots fixed to the respective limbs of the instrument, and that they are also transferred to the cloth from the same pivots, substantially, that perfect accuracy of transfer is had.

Having described my invention, what I claim, and desire to secure by Letters Patent, is—

1. The device A, composed of cross-limbs $A'$, $A^2$, $A^3$, and $A^4$, and bearing each their respective scales, substantially as shown and described, for the purposes set forth.

2. In a coat-measuring instrument, the combination, with cross-limbs $A'$, $A^2$, $A^3$, and $A^4$, provided with pivots $x$, $w$, $v$, and $u$, of tapes T, T', and $T^2$, provided with scale-measurement, all substantially as set forth, for the purpose specified.

3. In a coat-measuring instrument, the combination, with tape $T^2$, provided with scale, of cross-limbs $A'$, $A^2$, $A^3$, and $A^4$, made in fixed connection with each other, with limb $A^2$ bearing the scale described, and said tape pivoted to said limb, all substantially as and for the purpose set forth.

HUGH BROLLY.

Witnesses:
W. F. PARNHAM,
R. P. DUMARY.